United States Patent
Long et al.

(10) Patent No.: US 7,325,812 B2
(45) Date of Patent: Feb. 5, 2008

(54) GRIP ASSEMBLY FOR CLUTCH CAP, FRONT SLEEVE, REAR SLEEVE AND METHOD OF MAKING

(75) Inventors: Charles Keith Long, Seneca, SC (US); Daniel Alex Chunn, Kowloon (HK); Thomas Kam Kee Wong, Kowloon (HK); Dennis Wing Yuk Ma, Kowloon (HK); Xiao Ping Liu, Nan Chang (CN); Bing Hong Tam, Hong Kong (HK)

(73) Assignee: Eastway Fair Company Limited, Tortola (VG)

( * ) Notice: Subject to any disclaimer, the term of this patent is extended or adjusted under 35 U.S.C. 154(b) by 632 days.

(21) Appl. No.: 10/439,186

(22) Filed: May 14, 2003

(65) Prior Publication Data

US 2004/0227308 A1    Nov. 18, 2004

(51) Int. Cl.
B23B 5/00    (2006.01)

(52) U.S. Cl. .................. 279/62; 408/124; 279/902

(58) Field of Classification Search ............. 408/124; 279/60–64, 902; 16/421, 436, DIG. 12, 16/DIG. 18–19; 173/178, 181, 146; 74/558.5, 74/551.1; 81/177.1, 489, 900, 453; 428/35.7, 428/36.9

See application file for complete search history.

(56) References Cited

U.S. PATENT DOCUMENTS

| | | | |
|---|---|---|---|
| 911,012 A | 1/1909 | Jacobs | |
| 3,189,069 A * | 6/1965 | Stowell | 81/177.1 |
| 3,834,252 A | 9/1974 | Abell et al. | |
| 4,460,296 A | 7/1984 | Sivertson, Jr. | |
| 4,575,108 A | 3/1986 | Whitehead | |
| 4,664,394 A | 5/1987 | Theissig et al. | |
| 4,695,065 A | 9/1987 | Komatsu et al. | |
| 4,817,971 A | 4/1989 | Flynn | |
| 4,844,488 A | 7/1989 | Flynn | |
| 5,025,903 A | 6/1991 | Elligson | |
| 5,097,566 A * | 3/1992 | Decker et al. | 16/421 |
| 5,125,673 A | 6/1992 | Huff et al. | |
| 5,135,241 A * | 8/1992 | Huff et al. | 279/142 |
| 5,215,317 A * | 6/1993 | Jordan et al. | 279/63 |
| 5,253,879 A | 10/1993 | Huff et al. | |
| 5,261,665 A * | 11/1993 | Downey | 473/303 |
| 5,280,735 A * | 1/1994 | Kuipers et al. | 74/551.9 |
| 5,290,063 A * | 3/1994 | Lenhart | 280/821 |

(Continued)

FOREIGN PATENT DOCUMENTS

JP    62099007 A  *  5/1987

*Primary Examiner*—Monica Carter
*Assistant Examiner*—Jamila Williams
(74) *Attorney, Agent, or Firm*—Brinks Hofer Gilson & Lione; G. Peter Nichols

(57) ABSTRACT

A grip assembly for one of a clutch cap for a clutch mechanism, a rear sleeve or front sleeve for a chuck assembly having a chuck mechanism with a plurality of adjustable jaws. The grip assembly includes an inner sleeve having open top and an open bottom opposite the top and defining a longitudinal axis with a peripheral wall disposed between the first end and the second end and an elastomeric grip comprising a plurality of spaced apart ribs extending generally circumferentially about an outer surface of the front sleeve. An optional a cover can encircle the inner sleeve and have a plurality of spaced apart apertures to receive respective ribs.

12 Claims, 4 Drawing Sheets

U.S. PATENT DOCUMENTS

| | | |
|---|---|---|
| 5,330,204 A | 7/1994 | Huff et al. |
| 5,341,704 A | 8/1994 | Klemm |
| 5,360,073 A | 11/1994 | Akazawa |
| 5,431,420 A | 7/1995 | Huff et al. |
| 5,437,524 A | 8/1995 | Huang |
| 5,452,906 A | 9/1995 | Huff et al. |
| 5,476,273 A | 12/1995 | Shadeck et al. |
| 5,573,254 A | 11/1996 | Huff et al. |
| 5,584,213 A * | 12/1996 | Larson et al. ............ 74/551.99 |
| 5,601,003 A * | 2/1997 | Amtenbrink et al. ......... 81/489 |
| D382,457 S | 8/1997 | Ghode et al. |
| D386,662 S | 11/1997 | Tozawa et al. |
| 5,730,662 A * | 3/1998 | Rens .......................... 473/300 |
| 5,732,956 A | 3/1998 | Huff et al. |
| 5,784,935 A | 7/1998 | Korinek |
| 5,799,739 A | 9/1998 | Takaada et al. |
| 5,823,069 A * | 10/1998 | Roark et al. ................ 74/551.9 |
| 5,839,163 A * | 11/1998 | Hellmann .................... 16/436 |
| 5,882,016 A | 3/1999 | Chiang |
| 6,045,303 A | 4/2000 | Chung |
| 6,053,675 A | 4/2000 | Holland et al. |
| D429,134 S | 8/2000 | Schultz et al. |
| D433,909 S | 11/2000 | Long |
| D434,629 S | 12/2000 | Long |
| D440,850 S | 4/2001 | Ozawa et al. |
| 6,212,972 B1 * | 4/2001 | Yamane ..................... 74/551.9 |
| D441,268 S | 5/2001 | Heun |
| 6,276,231 B1 * | 8/2001 | Yamane ..................... 74/551.9 |
| 6,286,842 B1 | 9/2001 | Huff et al. |
| 6,408,524 B1 * | 6/2002 | Lai ............................. 30/324 |
| D467,481 S | 12/2002 | Watson |
| D469,675 S | 2/2003 | Chung |
| 6,676,557 B2 * | 1/2004 | Milbourne et al. ......... 475/286 |
| 6,745,883 B2 * | 6/2004 | Eto et al. ................. 192/56.62 |
| 6,763,747 B1 * | 7/2004 | Gierer et al. ................. 81/489 |
| 2002/0014749 A1 | 2/2002 | Huff et al. |
| 2002/0020972 A1 | 2/2002 | Yaksich |
| 2002/0054798 A1 | 5/2002 | Dils et al. |
| 2003/0178280 A1 | 9/2003 | Eto et al. |

* cited by examiner

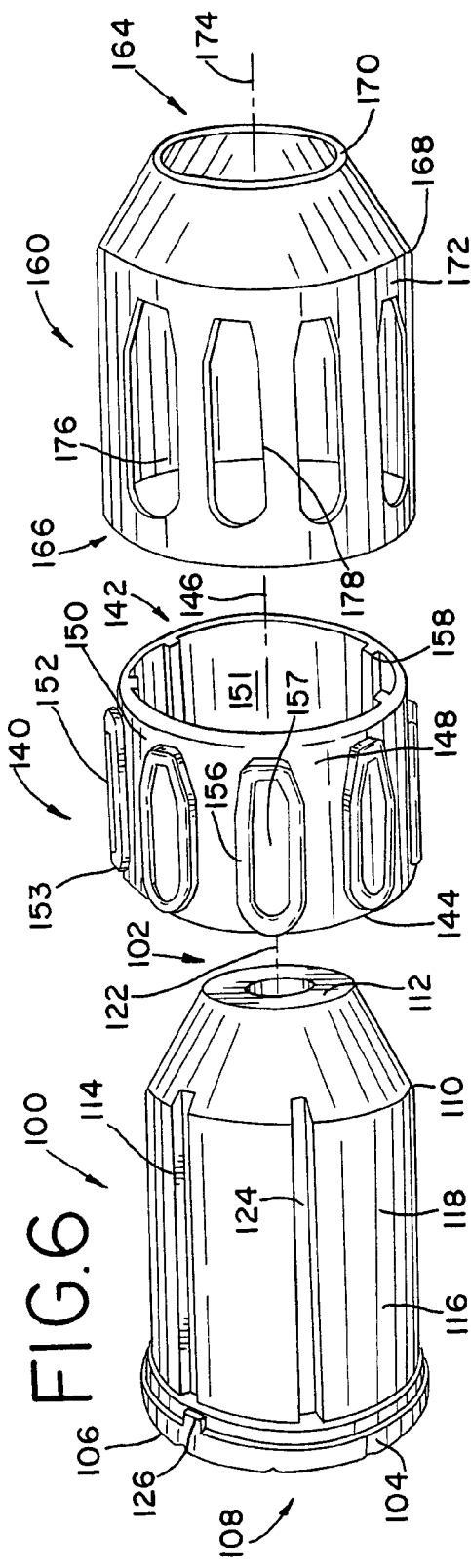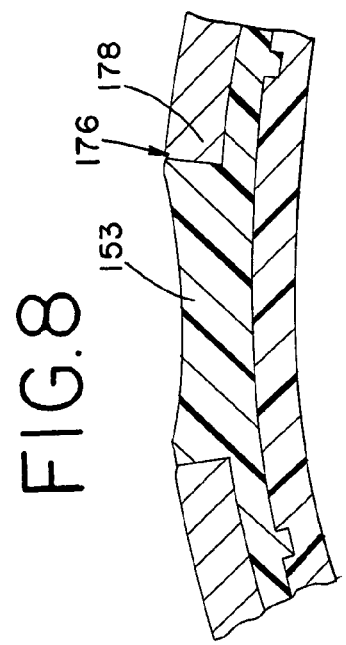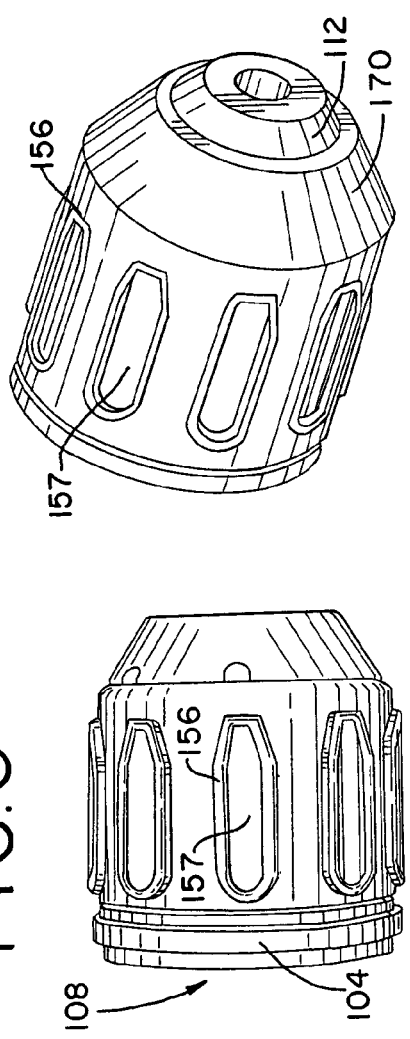

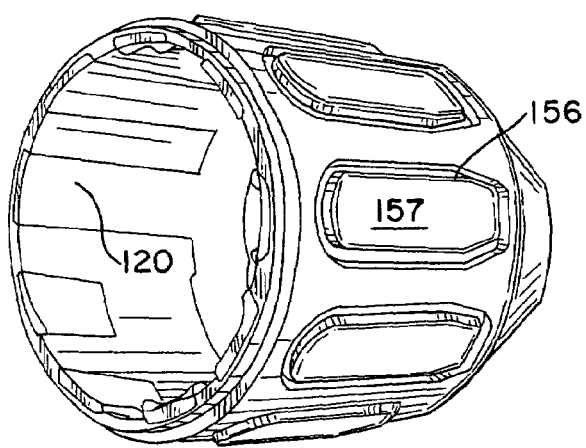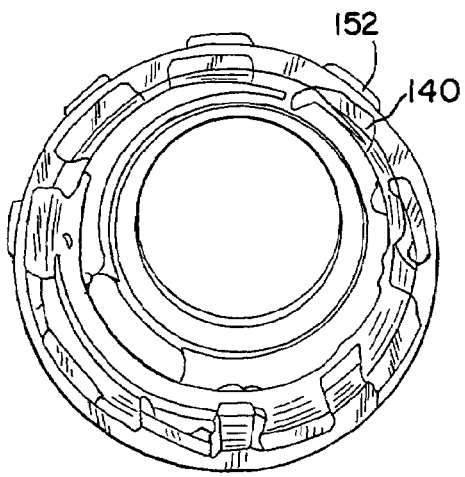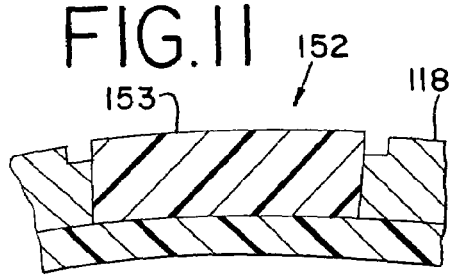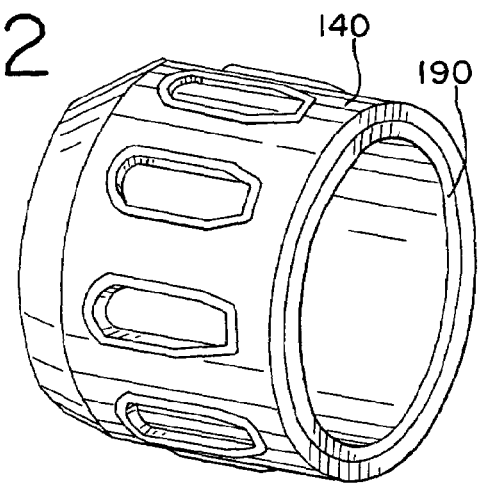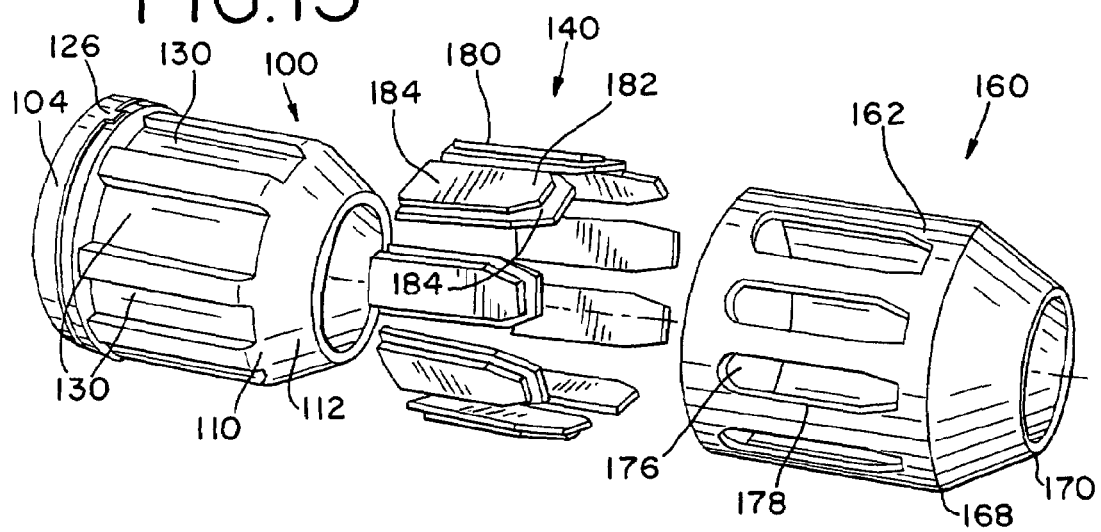

US 7,325,812 B2

GRIP ASSEMBLY FOR CLUTCH CAP, FRONT SLEEVE, REAR SLEEVE AND METHOD OF MAKING

BACKGROUND OF THE INVENTION

The present invention relates to a soft grip cap for a rotatable torque adjusting device of a rotary tool and to soft grip keyless chuck assemblies for use with the rotary tool.

In conventional hand-powered, electric-powered, and pneumatic-powered tool drivers, adjustable chucks are used for holding a tool such as a drill bit. A conventional chuck has a conical body threaded onto the drive shaft of the rotary tool. Three jaws spaced circumferentially 120° apart from each other are constrained in passageways defined by the chuck body. The spacing between the jaws is adjusted by rotating an adjustment ring, which encircles the chuck body. Such a chuck is keyless when the adjustment ring is rotated by hand. Keyless chucks typically have a front sleeve and a rear sleeve.

In addition, most tool drivers are provided with a torque adjusting device to allow the user to adjust the output torque provided by the rotation tool. The torque adjusting device is usually formed with a clutch cap or ring, which the user grasps to rotate and to adjust the torque. The torque adjusting device cooperates with the chuck such that when the torque adjusting device is adjusted the output provided to the chuck is likewise adjusted. Indications may be provided on the clutch cap to indict the torque set by the adjusting device.

It would be desirable to provide a quality gripping surface for each or both of the clutch cap and the chuck. Several attempts have been made to provide grip boots having high coefficients of friction for improving the user's grip on a chuck, especially a keyless chuck. For example, U.S. Pat. Nos. 5,452,906 and 5,476,273 each discuss the use of grip boots for improving the user's grip on a chuck.

One problem associated with these soft grip chucks is the fact that the soft grip material is not very durable. When using a drill having a soft grip chuck to drill in a small constrained location, incidental contact of the rotating chuck with another object, such as an obstructing portion of the workpiece, may damage the soft grip material. This excessive wearing and damaging of the soft grip is very undesirable. One approach to address that problem is shown in U.S. Pat. No. 5,882,016. There, ribs are provided on the sleeve such that they extend radially outward beyond the elastomeric material to protect the elastomeric material from wear.

BRIEF SUMMARY OF THE INVENTION

With the above in mind, the present invention includes a grip assembly for one of a clutch cap for a clutch mechanism, a rear sleeve or front sleeve for a chuck assembly having a chuck mechanism with a plurality of adjustable jaws. The grip assembly includes an inner sleeve having open top and an open bottom opposite the top and defining a longitudinal axis with a peripheral wall disposed between the first end and the second end and an elastomeric grip comprising a plurality of spaced apart ribs extending generally circumferentially about an outer surface of the front sleeve An optional a cover may encircle the inner sleeve and have a plurality of spaced apart apertures to receive respective ribs.

In another aspect of the present invention, a grip for one of a clutch cap, rear sleeve, or front sleeve for a rotary tool includes an open top and a open bottom opposite the top defining a longitudinal axis, a radial wall connecting the open top and the open bottom, the wall having an outer surface, wherein the radial wall is formed from an elastomeric material and, a plurality ribs extending outward from the outer surface and parallel with the longitudinal axis to provide a gripping surface. A cover having a plurality of apertures to receive the respective ribs may be provided to protect the elastomeric material.

In another embodiment, a grip for one of a clutch cap, rear sleeve, or front sleeve for a rotary tool includes an open top and an open bottom opposite the top defining a longitudinal axis, and a radial wall connecting the open top and the open bottom. The wall has a plurality of apertures to receive respective ribs of elastomeric material extending outward through the apertures.

The present invention also relates to a method of making a grip for one of a clutch cap, rear sleeve, or front sleeve for a rotary tool. The method includes providing a sleeve having an open top and an open bottom opposite the top defining a longitudinal axis and a radial wall connecting the open top and the open bottom and having a plurality of apertures. An elastomeric material is provided on the inner surface of the sleeve under conditions such that the elastomeric material flows through the apertures and such that the elastomeric material bonds to the inner surface of the sleeve. In accordance with this method, the sleeve may be made from an injection moldable plastic so that the sleeve and the elastomeric material may be simultaneously molded.

BRIEF DESCRIPTION OF THE DRAWINGS

FIG. 5 is a perspective view of a front sleeve according to one embodiment of the present invention.

FIG. 6 is an exploded view of another embodiment of the front sleeve according to the present invention.

FIG. 7 is a perspective view of a front sleeve according to another embodiment of the present invention.

FIG. 8 is an enlarged view of a portion of the front sleeve of FIG. 7.

FIG. 9 is a side perspective view of another embodiment of the front sleeve according to the present invention.

FIG. 10 is a rear view of the sleeve of FIG. 9.

FIG. 11 is an enlarged view of a portion of the front sleeve of FIG. 9.

FIG. 12 is a perspective view of a rear sleeve according to one embodiment of the present invention.

FIG. 13 6 is an exploded view of another embodiment of the front sleeve according to the present invention.

DETAILED DESCRIPTION OF THE INVENTION

Figure 1:
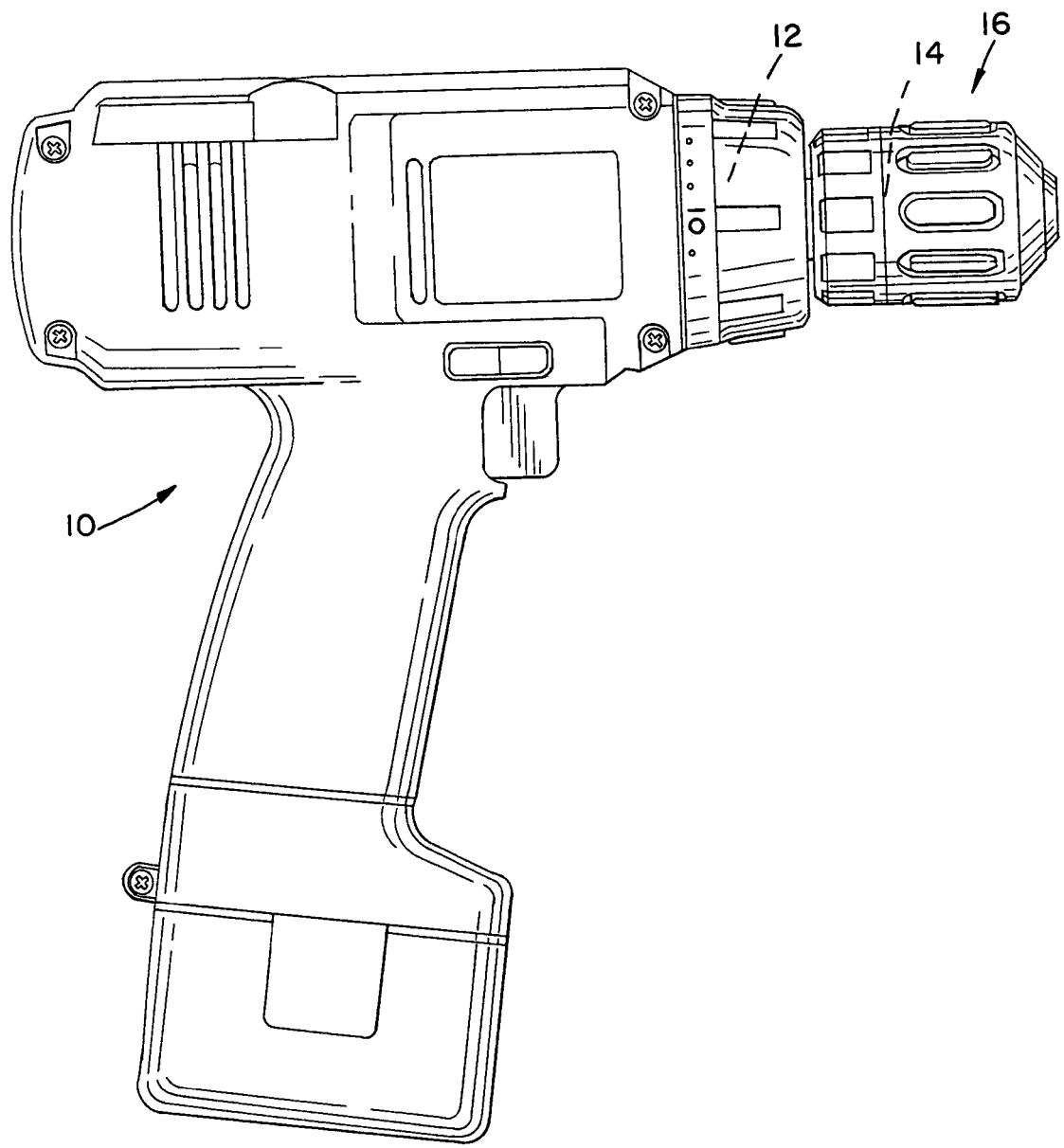
FIG. 1 is a rotary tool in the form of a drill having a clutch cap and a chuck in accordance with one embodiment of the present invention.

Referring now to the drawings and initially to FIG. 1, a rotary tool in the form of a drill is generally indicated at 10. The drill 10 includes a motor disposed in a housing. The motor is operable to drive a drive shaft. As shown, the drill 10 is battery-powered. The drill 10, however, may be powered by a conventional AC power source. Power is selectively supplied to the motor by pressing the trigger. The drill is conventional and does not form part of the present invention, except to the extent that the clutch cap and chuck assembly of the present invention are useful with a rotary tool such as the drill shown in FIG. 1.

A clutch assembly is located at a position to with respect to the drive shaft to adjust the output torque. Clutch assemblies are known and the function and operation of the clutch assembly is not material to the clutch cap of the present invention. The clutch assembly includes a clutch mechanism 12 operatively associated with the drive shaft to adjust the output torque and a clutch cap 20 that surrounds at least a portion of the clutch mechanism 12. The clutch cap 20 is operatively associated with the clutch mechanism 12 such that rotation of the clutch cap 20 will adjust the output torque of the drive shaft. Desirably, the clutch cap 20 is provided with indicia 22 to assist the user in adjusting the desired torque. The clutch cap 20 and grip assembly 16 will be described in more detail below.

The drill also includes a chuck assembly 14 that is mounted to the drive shaft. It is to be understood that the chuck assembly 14 of the present invention may be used with other rotary-driven tools, and that the drill 10 illustrated in FIG. 1 is one example of such tools. For example, screw drivers, nut drivers, burrs, mounted grinding stones, and other cutting or abrading tools may employ embodiments of the present invention.

The chuck assembly 14 includes a typical chuck mechanism having a chuck body member. It is believed that one skilled in the art can practice the subject application with any suitable mechanical chuck mechanism. Typically, the chuck body includes a forward section and a rearward section. As shown in FIG. 1 a front sleeve 100 and a rear sleeve 190 incorporating the grip assembly 16 of the present invention surrounds the chuck mechanism. An axial bore is formed in the forward section of the chuck body. The axial bore is somewhat larger than the largest tool shank that the chuck mechanism is designed to accommodate. A threaded bore is formed in the rearward section of the chuck body, and is sized to mate with a threaded end of drive shaft. If desired, a tapered unthreaded bore sized to mate with a tapered drive shaft may replace the threaded bore.

A plurality of jaws extends through passageways formed in the chuck body. Typically, three jaws are used and each jaw is separated from the adjacent jaws by an arc of 120°. The axes of the passageways and the jaws are angled with respect to the chuck body axis, and intersect the chuck body axis at a common point ahead of the chuck body. Each jaw has a tool-engaging surface that is generally parallel to the axis of the chuck body. Threads are located on the outer surface of each jaw.

An adjustment ring encircles the chuck body and cooperates with the jaws. The threads are provided on the inner surface of the adjustment ring to mate with the threads on the jaw outer surfaces. By rotating the adjustment ring, the jaws are caused to move toward or away from each other, dependent upon the direction of rotation of the adjustment ring. By rotating the adjustment ring, the jaws can be positioned to secure bits of varying sizes.

The above description of the rotary tool is provided by way of background and it is believed that the grip assembly 16 of the present invention can be used with a variety of clutch mechanisms 12 and/or chuck assemblies 14.

Figure 2:
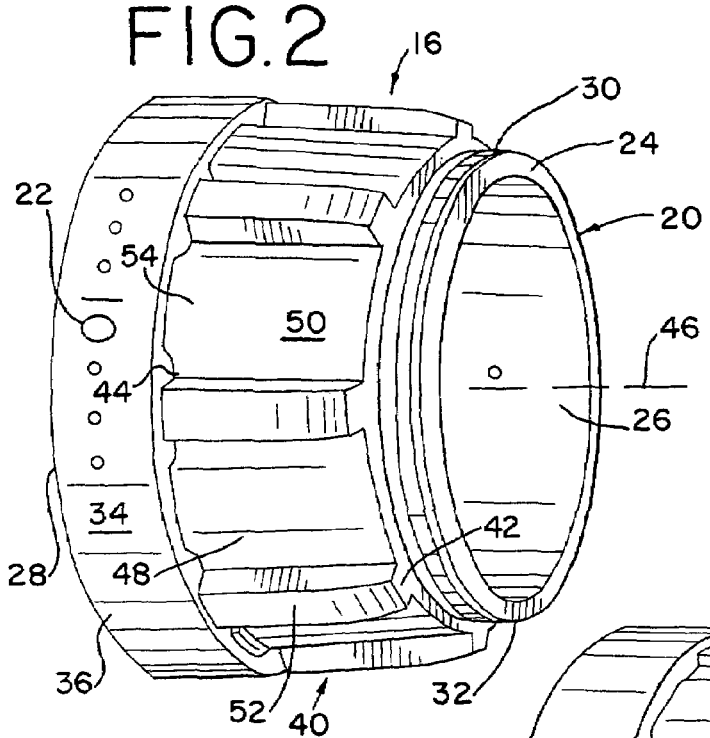
FIG. 2 is a side perspective view of a clutch cap according to one embodiment of the present invention.
Figure 3:
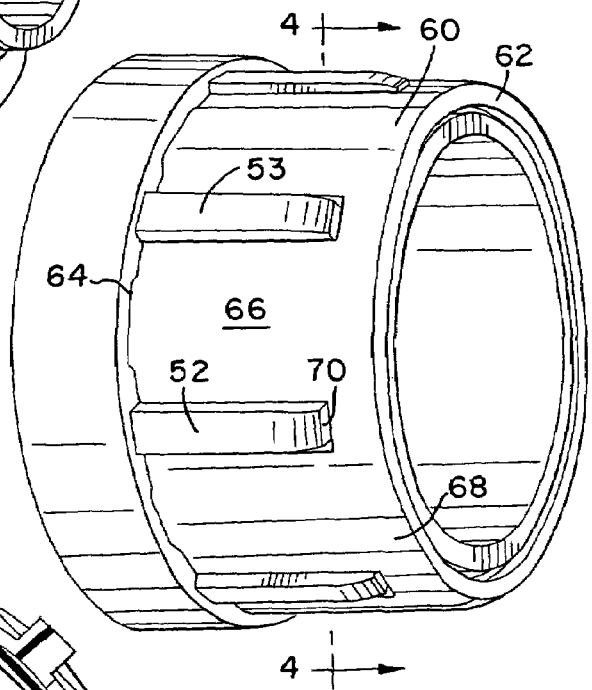
FIG. 3 is side perspective view of a clutch cap according to another embodiment of the present invention.
Figure 4:
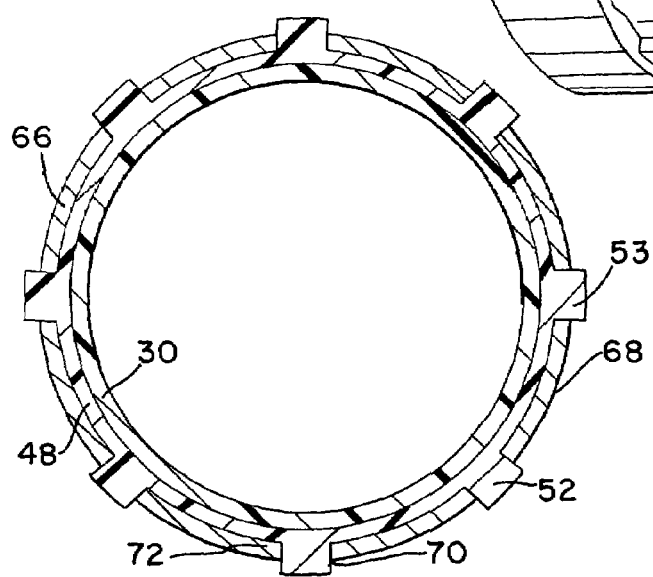
FIG. 4 is a cross-sectional view of the clutch cap of FIG. 3 taken along line 4-4 of FIG. 3.

Turning now to FIGS. 2-4 one embodiment of the grip assembly 16 is shown. In this embodiment, the grip assembly 16 is defined by a clutch cap 20, a grip 40, and an optional cover 60. The clutch cap 20 is typically cylindrically shaped to surround the clutch mechanism 12 and conform to the overall appearance of the rotary tool 10. The clutch cap 20 includes inner sleeve 24 that may be formed by injection molding a hard plastic material such as a structural plastic such as polycarbonate, a filled polypropylene, e.g., glass-filled polypropylene, or a blend of structural materials. Alternatively, the inner sleeve 24 may be formed from stamped or formed metal.

The inner sleeve 24 has a first end 26, a second end 28, and a peripheral wall 30 connecting the first 26 and second end 28. The first end 26 and the second end 28 define a longitudinal axis that extends through the first 26 and second ends 28. The first end 26 and the second end 28 are open to allow portions of the rotary tool such as the drive shaft to extend into and/or through the inner sleeve 24.

The inner sleeve 24 has a diameter of a size sufficient to surround the clutch mechanism 12 (not shown). In one embodiment, the first end 26 has a ledge 34 that has an outer periphery 36 with a diameter that is greater than the outer periphery 32 of the peripheral wall 30. The ledge 34 acts to stop longitudinal movement of the grip 40.

The grip 40 is shown as cylindrically shaped. Although the grip 40 may have any suitable shape, typically it will be cylindrical to fit the cylindrical shape of the inner sleeve 24, which surrounds the clutch mechanism 12.

The grip 40 has an open top 42 and an open bottom 44 opposite the open top 42 and defining a longitudinal axis 46 that is parallel to the longitudinal axis of the inner sleeve 24. A peripheral wall 48 connects the open top 42 and the open bottom 44. In the instance where the grip 40 is cylindrical, the peripheral wall 48 will be radial. The peripheral wall 48 has an outer surface 50 and ribs 52 that extend outward from the outer surface 50 to provide a gripping surface.

The ribs 52 are shown as elongate members parallel to the longitudinal axis 46. The ribs 52 are located around at least a portion of the peripheral wall 48 and desirably are located around the entire portion of the peripheral wall 48. The ribs 52 are spaced apart to define a valley 54 between adjacent ribs. By providing alternating ribs 52 to define a valley 54, a better grip surface may be provided. The ribs 52 extend a portion of the distance from the bottom 44 to the top 42. As shown in FIG. 2, the ribs 52 extend the entire distance from the bottom 44 to the top 42. As shown in FIG. 3, the ribs 52 extend only a portion of the distance from the bottom 44 to the top 42.

Where the inner sleeve 24 is provided with a ledge 34, the bottom 44 of the grip 40 is adjacent the ledge 34. Desirably, the ribs 52 do not extend radially outward a distance greater than the diameter of the outer surface 336 of the ledge 34 so that the clutch cap 20 presents a substantially uniform appearance.

A 60 cover may be provided to cooperate with the grip 40 and to provide protection from wear to a substantial amount of the grip 40. The cover 60 is provided with an open top 62, an open bottom 64 and a peripheral wall 66 connecting the top 62 and the bottom 64. When a cover 60 is provided, the bottom 64 is adjacent the first end 26 of the inner sleeve 24 and when the inner sleeve 24 is provided with a ledge 34, the bottom 64 of the cover 60 is adjacent the ledge 34.

The wall 66 is provided with a plurality of spaced apart apertures 70 that receive respective ribs 52 of the grip 40. The ribs 52 may extend radially outward a distance beyond the top surface 68 of the cover 60, as best seen in FIG. 4. Alternatively, the ribs 52 may be sized such that they extend radially outward a distance that is substantially flush with the top surface 68 of the cover 60. In yet another embodiment, the ribs 52 may be sized such that they extend radially outward a distance just below the top surface 68 of the cover 60. In this embodiment, the top surface 53 of the ribs may have a concave shape to provide a depression to enhance the grippability of the clutch cap 20.

The grip 40 is formed of a material that is softer than the material that is used for the tool housing so that the user can obtain a suitable grip to rotate the clutch cap 20. Where a cover 60 is provided, the grip 40 will likewise be formed of a material that is softer than the material is used for the cover 60. Desirably, the grip 40 is formed of an elastomeric material such as a natural or synthetic elastomer such as santoprene or vyram. The elastomeric material may have a hardness from Shore 45A durometer to Shore 50D durometer. A desirable hardness is about Shore 80A durometer.

Turning now to FIGS. 5-12, the grip assembly 16 for use with sleeves for a chuck assembly is shown. Referring to FIG. 5, a grip assembly 16 for use as a front sleeve 100 of a chuck assembly 14 is shown. This grip assembly 16 includes a front sleeve 100 and a grip 140. FIG. 6 shows an exploded view of a grip assembly 16 useful for the front sleeve 100 of a chuck assembly 14. FIG. 7 shows an alternative grip assembly 16 in an assembled condition. The grip assembly 16 includes a front sleeve 100, a grip 140, and optionally, a cover 160.

The front sleeve 100 is affixed to the chuck mechanism (not shown) or at least a portion of the chuck mechanism of the chuck assembly 14. The front sleeve 100 may be formed by injection molding a hard plastic material such as a structural plastic such as polycarbonate, a filled polypropylene, e.g., glass-filled polypropylene, or a blend of structural materials. The front sleeve 100 includes a first end 102 and a second end 108 with a peripheral wall 114 extending between the first end 102 and the second end 108. A longitudinal axis 122 is defined from the first end 102 to the second end 108. The first end 102 may be provided with a ledge 104 that has an outer periphery 106 with a diameter that is greater than the outer periphery 116 of the peripheral wall 114. The ledge 104 acts to stop longitudinal movement of the grip 140. The second end 108 may have a leading edge 110 that is tapered to define a nose 112.

In one embodiment, the outer surface 118 of the front sleeve 100 may be provided with a plurality of grooves 124 that are open at the second end 108 to receive complementary ribs 152 provided on the grip 140, as will be explained in more detail below. Alternatively, the grooves 124 need not be open at either end, and the complementary ribs 152 will be received within the grooves 124. The grooves 124 extend at least a portion from the second end 108 toward the first end 102.

The grip 140 is shown as cylindrically shaped. Although the grip 140 may have any suitable shape, typically it will be cylindrical to fit the cylindrical shape of the front sleeve 100, which surrounds the chuck mechanism (not shown). The grip 140 is desirably formed of a material that is softer than the material of the front sleeve 100. In most instances, the grip 140 is formed from an elastomeric material that may be formed of a natural or synthetic elastomer such as santoprene or vyram. The elastomeric material may have a hardness from Shore 45A durometer to Shore 50D durometer. A desirable hardness is about Shore 80A durometer.

The grip 140 has an open top 142 and an open bottom 144 opposite the open top 142 and defining a longitudinal axis 146 that is parallel to the longitudinal axis of the front 100 sleeve. A peripheral wall 148 connects the open top 142 and the open bottom 144. In the instance where the grip 140 is cylindrical, the peripheral wall 148 will be radial. The distance between the top 142 and the bottom 144 of the grip 140 is such that the grip 140 covers a substantial portion of the front sleeve 100 from the first end 102 of the sleeve to the leading edge 110 at the second end 108 of the sleeve. It is to be understood, however, that the grip 140 may have any suitable length to provide a grip surface.

The peripheral wall 148 has an outer surface 150 with ribs 152 that extend outward from the outer surface 150 to provide a gripping surface. The ribs 152 are shown as elongate members parallel to the longitudinal axis 146. The ribs 152 are located around at least a portion of the peripheral wall 148 and desirably are located around the entire portion-of the peripheral wall 148. The ribs 152 are spaced apart such that adjacent ribs 152 define a valley 154. By providing alternating ribs 152 to define a valley 154 a better grip surface may be provided. The ribs 152 extend a portion of the distance from the bottom 144 to the top 142. As shown in FIG. 6, the ribs 152 extend the entire distance from the bottom 144 to the top 142.

The ribs 152 may further be shaped to define a peripheral surface 156 that extends radially outward a distance greater than a top surface 153 of the ribs 152. The peripheral surface 156 of the ribs 152 defines a depression 157 within the peripheral surface 156 that will provide a gripping surface.

The grip 140 has an inner surface 151 with a diameter about the same size as the diameter of the outer surface 118 of the front sleeve 100. Because the grip 140 is made of an elastomeric material, it can be stretched somewhat to place the grip 140 onto the outer surface 118 of the front sleeve 100. When in place, the elasticity of the grip 140 will position and hold the grip 140 onto the front sleeve 100. Alternatively, the grip 140 may be co-molded with the front sleeve 100 such that the grip 140 is integrally formed with the sleeve 100.

In another embodiment, as shown in FIG. 6, the inner surface 151 of the grip 140 is provided with a plurality of complementary ribs 158 that will engage respective plurality of grooves 124 provided on the outer surface 118 of the front sleeve 100. The complementary ribs 158 and grooves 124, when engaged with each other, will minimize or limit rotational movement of the grip 140 with respect to the front sleeve 100. At the same time, the grip 140 can be removed from the sleeve 100 when the grip is worn.

As noted above, the grip assembly 16 for sleeves optionally includes a cover 160. Desirably, the cover 160 is made of a material that is harder than the material of the grip 140 to protect the grip 140 if the grip assembly 16 contacts a work surface or the like. In this regard, the cover 160 may be made of relatively hard structural plastic or metal. The cover 160 may be formed from stamped metal.

Referring to FIG. 6, the cover 160 is shown with a first end 164 and a second end 166 with a peripheral wall 172 extending between the first end 164 and the second end 166. A longitudinal axis 174 is defined from the first end 164 to the second end 168. The peripheral wall 172 of the cover 160 is provided with a plurality of apertures 176 to receive the ribs 152 of the grip 140 and through which the ribs 152 of the grip 140 may extend. The cover 160 surrounds the front sleeve 100 and is dimensioned such that the first end 164 of the cover 160 is adjacent the first end 102 of the front sleeve 100. Similarly, the second end 166 of the cover 160 may have a leading edge 168 that is tapered to define a nose 170 that is adjacent to the nose 112 of the front sleeve 100.

When the first end 102 of the sleeve 100 is provided with a ledge 104, the first end 164 of the cover 160 may be provided with tabs or recesses (not shown) to engage with cooperating tabs or recesses 126 provided the first end 102 or on the ledge 104 to removably secure the cover 160 to the front sleeve 100. The exact configuration of such cooperating tabs or recesses is not important so long as the cover 160 can be removably secured to the front sleeve 100.

As noted above, the cover 160 is provided with apertures 128 that receive the ribs 152 of the grip 140. When the cover 160 is in place, the ribs 152 may extend radially outward a distance beyond the top surface 162 of the cover 160. Alternatively, the ribs 152 and their peripheral sides 156 may extend radially outward such that they are substantially flush with the top surface 162 of the cover 160, as seen in FIG. 11. In another embodiment, the ribs 152 may have a concave top surface 153, as best seen in FIG. 8 so that only the peripheral sides 156 are substantially flush with the top surface 162 of the cover 160. In each of the embodiments, however, alternating sections of harder and softer material is provided (due to the alternating sections of the cover 160 and the ribs 152) to define a gripping surface.

Turning now to FIGS. 9-11, a unitary integrally molded front sleeve 100 according to one embodiment of the present invention is shown, with like reference numbers referring to like elements. In this embodiment, the front sleeve 100 surrounds the grip 140. The front sleeve 100 is similar to that shown in FIG. 6, except it does not have grooves 124 to receive the grip. Instead, the front sleeve is provided with a plurality of apertures 128 to receive the ribs 152 of the grip 140 such the ribs 152 extend in a radially outward direction. The ribs 152 may extend outward in the same manner as described above. In other words, the ribs 152 may extend beyond the outer surface 118 of the sleeve 100, they may be flush with the outer surface 118 of the sleeve 100, or they may be just below the outer surface 118 of the sleeve 100.

Advantageously, the front sleeve 100 of this embodiment may be co-molded or made in a manner such that the grip 140, which is formed from an elastomeric material, can be applied to the inner surface 120 of the front sleeve 100 under conditions and in a manner such that the elastomeric material will flow into the apertures 128 of the sleeve 100.

FIG. 13 shows another embodiment of the grip assembly 16 of the present invention as incorporated on a front sleeve 100 for a chuck assembly 14. In this embodiment, the front sleeve 100 is provided with a plurality of depressions 130 about the circumference of the peripheral wall 114. The depressions 130 receive complementary shaped ribs 180 that define a grip 140 with spaced apart ribs 180 extending generally circumferentially about the peripheral wall 114 of the front sleeve 140. The ribs 180 may be adhered or attached to the front sleeve such as by molding or other methods. The ribs 180 may also be provided with a flange 186 that surrounds the periphery of the ribs 180. As seen in FIG. 13, the ribs may have a peripheral side wall 182 that defines a closed shape within which a valley 184 is defined. Surrounding the peripheral side wall of the ribs is a flange 186.

A cover 160 surrounds the front sleeve 100 and is provided with apertures 176 such that a portion of the ribs 180 are received by the apertures 176 and another portion is contacted by the area surrounding the apertures 178 to assist in locating and maintaining the ribs 152 in place. In particular, when a flange 186 is provided, the portion of the cover adjacent the aperture 178 will contact the flange 186 to hold the rib 180 in place.

An optional rear sleeve 190 may be affixed to the chuck mechanism of the chuck assembly 14. If desired, the rear sleeve 190 may be omitted and the front sleeve 100 can extend to the rearward section of the chuck body. This alternative is feasible when a spindle lock is provided on the driver or when the driver motor is used to tighten or loosen the jaws.

If a rear sleeve 190 is provided, it may incorporate the grip assembly 16 of the present invention in the same manner as described above with respect to the front sleeve 100 and the clutch cap 20. For example, FIG. 12 shows an exemplary rear sleeve 190 incorporating the grip assembly 16 of the present invention.

While certain embodiments of the grip assembly 16 have been described with respect to either the clutch cap 20 or the front sleeve 100, it should be understood that each embodiment can be used either with the clutch cap 20, the front sleeve 100, the rear sleeve 190, and any combination of them or all of them. For example, the grip assembly 16 shown in FIG. 13 can be used with the clutch cap 20, the rear sleeve 190, or any combination of the front sleeve 100, the rear sleeve 190, the clutch cap 20, or all of them.

While the invention has been described in conjunction with specific embodiments it is to be understood that many alternatives, modifications, and variations will be apparent to those skilled in the art in light of the foregoing detailed description. It is therefore intended that the foregoing description be regarded as illustrative rather than limiting, and that it be understood that it is the following claims, including all equivalents, that are intended to define the spirit and scope of this invention.

What is claimed:

1. A grip assembly for one of a clutch cap for a clutch mechanism, a rear sleeve or front sleeve for a chuck assembly having a chuck mechanism with a plurality of adjustable jaws comprising:
   a. an inner sleeve having open top and an open bottom opposite the top and defining a longitudinal axis with a peripheral wall disposed between the first end and the second end;
   b. an elastomeric grip comprising a plurality of spaced apart ribs extending generally circumferentially about an outer surface of the inner sleeve, wherein the inner sleeve has an outer surface with a plurality of depressions to respectively receive the plurality of ribs; and,
   c. a cover encircling the inner sleeve and having a plurality of spaced apart apertures to receive respective ribs.

2. The grip assembly of claim 1 wherein the ribs extend outward beyond a top surface of the cover.

3. The grip assembly of claim 1 wherein a top surface of the ribs is substantially flush with a top surface of the cover.

4. The grip assembly of claim 1 wherein the elastomeric grip comprises:
   a. an open top and a open bottom opposite the top defining a longitudinal axis; and
   b. a radial wall connecting the open top and the open bottom, the wall having an outer surface, wherein the radial wall Is formed from an elastomeric material such that the plurality of ribs extend outward from the outer surface of the wall and parallel with the longitudinal axis.

5. The grip assembly of claim 4 wherein the radial wall has an inner surface with a plurality of ribs extending parallel with the longitudinal axis.

6. In a rotary tool having a handle, a motor, a rotatable shaft driven by the motor and extending from a forward end of the tool, a clutch mechanism operatively engaged with the rotatable shaft to adjust the torque of the shaft, the improvement comprising a clutch cap operatively associated with the clutch mechanism and comprising:
   a. an inner sleeve having a first end opposed to a second end to define a longitudinal axis with a peripheral wall disposed between the first end and the second end; and, b. an elastomeric grip comprising a plurality of spaced apart ribs extending generally circumferentially about the inner sleeve to provide a gripping surface; and, c. a sleeve surrounding the grip and having a plurality of apertures to receive the ribs.

7. In a rotary tool having a handle, a motor, a rotatable shaft driven by the motor and extending from a forward end of the tool, and a chuck assembly operatively engaged with the rotatable shaft and having a chuck mechanism with a plurality of adjustable jaws, the improvement comprising:

a. a front sleeve encircling and attached to the chuck mechanism;

b. an elastomeric grip comprising a plurality of spaced apart ribs extending generally circumferentially about the front sleeve; and, c. a cover encircling the front sleeve and having a plurality of spaced apart apertures to receive respective ribs.

8. In a rotary tool having a handle, a motor, a rotatable shaft driven by the motor and extending from a forward end of the tool, a clutch mechanism operatively engaged with the rotatable shaft to adjust the torque of the shaft, and a chuck assembly operatively engaged with the rotatable shaft and having a chuck mechanism with a plurality of adjustable jaws, the improvement comprising:

a. a clutch cap operatively associated with the clutch mechanism and comprising:

b. an inner sleeve having a first end opposed to a second end to define a longitudinal axis with a peripheral wall disposed between the first end and the second end;

c. an elastomeric grip comprising a plurality of spaced apart ribs extending generally circumferentially about the inner sleeve to provide a gripping surface;

d. a front sleeve encircling and attached to at least a portion of the chuck mechanism;

e. an elastomeric grip comprising a plurality of spaced apart ribs extending generally circumferentially about the front sleeve; and, f. a cover encircling the front sleeve and having a plurality of spaced apart apertures to receive respective ribs.

9. A chuck assembly having a chuck mechanism with a plurality of adjustable jaws comprising:

a. a front sleeve encircling at least a portion of the chuck mechanism;

b. an elastomeric grip comprising an open top and a open bottom opposite the top defining a longitudinal axis, a radial wall formed from an elastomeric material connecting the open top and the open bottom and having an outer surface;

c. a plurality of spaced apart ribs extending generally circumferentially about the front sleeve and extending outward from the outer surface of the wall parallel with the longitudinal axis; and, d. a cover encircling at least a portion of the front sleeve and having a plurality of spaced apart apertures to receive respective ribs.

10. The grip assembly of claim 9 wherein the ribs extend outward beyond a top surface of the cover.

11. The grip assembly of claim 9 wherein a top surface of the ribs is substantially flush with a top surface of the cover.

12. The grip assembly of claim 9 wherein the radial wall has an inner surface with a plurality of ribs extending parallel with the longitudinal axis.

* * * * *

UNITED STATES PATENT AND TRADEMARK OFFICE
CERTIFICATE OF CORRECTION

PATENT NO. : 7,325,812 B2
APPLICATION NO. : 10/439186
DATED : February 5, 2008
INVENTOR(S) : Charles Keith Long et al.

It is certified that error appears in the above-identified patent and that said Letters Patent is hereby corrected as shown below:

In the Claims

Column 8, in claim 4, line 7, after "radial wall" delete "Is" and substitute --is-- in its place.

Signed and Sealed this

Nineteenth Day of August, 2008

JON W. DUDAS
*Director of the United States Patent and Trademark Office*